Patented May 7, 1940

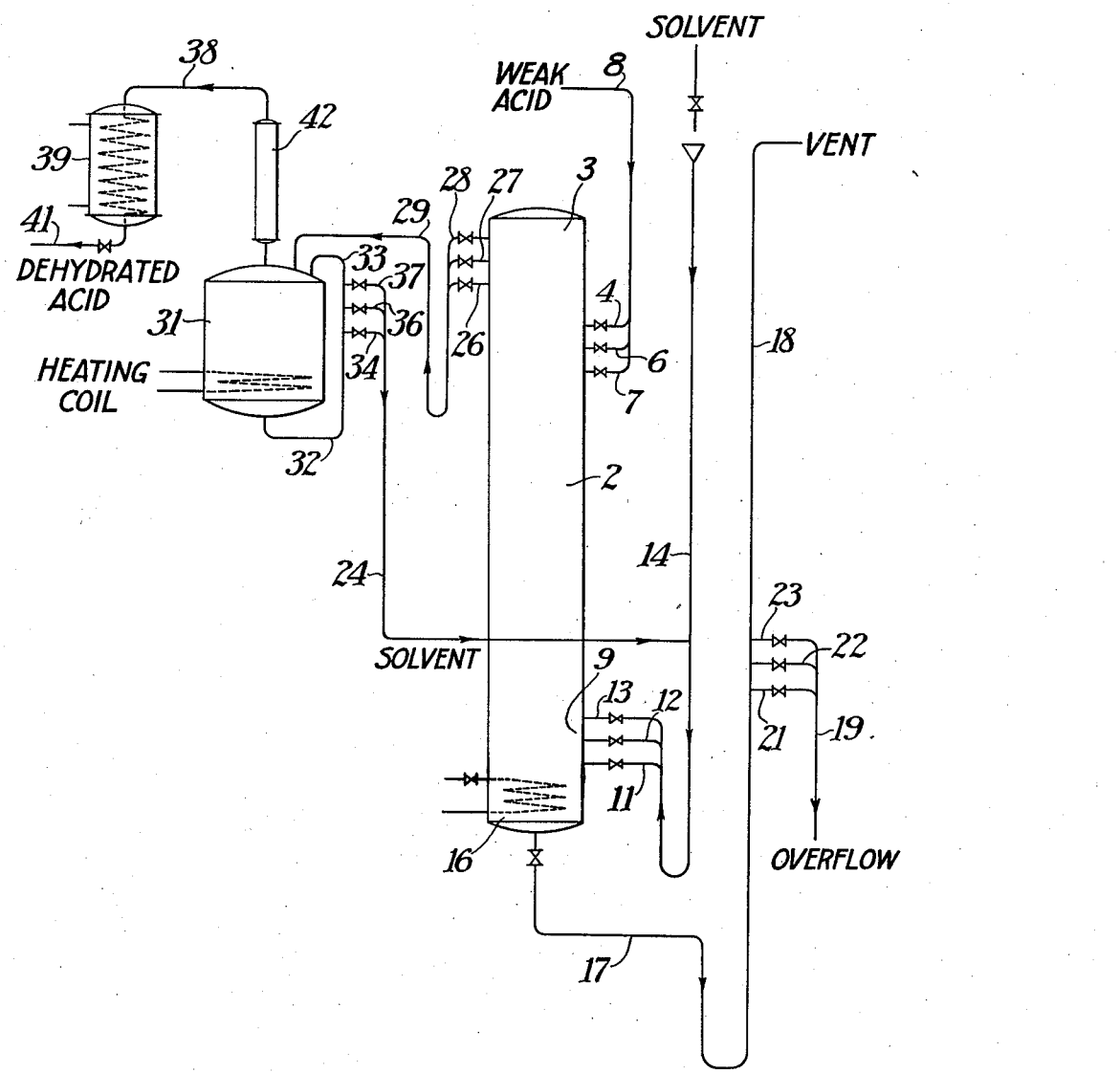

2,199,983

UNITED STATES PATENT OFFICE 2,199,983

EXTRACTION OF FATTY ACIDS

Bernard K. Bright, Kingsport, Tenn., assignor to Eastman Kodak Company, Rochester, N. Y., a corporation of New Jersey Application March 5, 1937, Serial No. 129,237

12 Claims. (Cl. 260—541)

This invention relates to solvents, processes and apparatus for removing acid from aqueous solutions containing aliphatic acids, and more particularly to solvents and their processes of use in the dehydration of dilute aqueous solutions containing acetic, propionic and other aliphatic acids or mixtures thereof by extraction and distillation with agents comprised of 10 carbon atom alcohols.

The complete or partial dehydration of aqueous solutions containing aliphatic acids or mixtures thereof is a problem of great technical importance. As is well known in the art and as pointed out in various publications and patents, great quantities of aqueous solutions containing aliphatic acids are obtained in the industry from various sources. For example, such aqueous aliphatic solutions are obtained in the manufacture of cellulose esters, from pyroligneous liquor and from fermentation processes.

Various extraction methods have been suggested for the treatment of such aliphatic acid-containing solutions. One such type process involves the use of solvents which have low boiling points and other characteristics such that the solvent is recovered as a head product and the acid as the tail product. However, my process concerns the type procedure wherein reverse conditions are present. That is, in my type process the solvent is generally the tail product rather than the acid. Certain extraction processes of this type are known in the art. However, such processes have involved the use of various aromatic compounds such as phenols, creosotes and the like. In many instances, those high boiling point solvents and processes which have been developed have required that varying amounts of weak acid be recycled to the system. Such processes have not been susceptible to simplified continuous operation. In addition, the use of certain prior art solvents has been restricted to dilute solutions.

I have found extracting agents, methods and apparatus whereby economies in the dehydration of aqueous aliphatic acid solutions not hitherto achieved are possible. By my invention, considerable steam savings may result and the dehydration of solutions containing varied amounts of aliphatic acid is made possible.

This invention has for one object to provide a solvent for the extraction of the lower aliphatic acids. A still further object is to provide a 10 carbon atom alcoholic solvent for the extraction of aqueous solutions containing lower aliphatic acids. Still another object is to provide a solvent which is suitable for use in extracting aliphatic acids from aqueous solutions containing varying amounts of water. A still further object is to provide a solvent for aliphatic acids which may be employed either in a heated or cooled condition.

Still another object is to provide a simplified and economic process for the dehydration of aqueous solutions containing aliphatic acids. Still another object is to provide a process for the recovery of aliphatic acids by extraction from solutions containing a high content of acid. Another object is to provide a process suitable for continuous operation.

Still another object is to provide extraction apparatus for contacting a solvent with aqueous aliphatic acid solutions. Other objects will appear hereinafter.

These objects are accomplished by the following invention which relates to an extraction process for the dehydration of solutions containing aliphatic acids. I have found a new group of agents for extracting aliphatic acids from aqueous solutions which extracting agents are superior in many respects to any heretofore known, together with process and apparatus for employing these agents.

My process may be carried out in extraction apparatus and fractionating equipment of a known type arranged in various ways. However, I preferred to employ apparatus and the plant layout disclosed in the accompanying drawing. These features are further described hereinafter and it is to be understood that my process and apparatus, although particularly explained with respect to one agent, is applicable to the various other agents embraced by this application.

In the accompanying drawing, 2 designates an extraction unit. This extraction unit may be of various types such as in the nature of a bubble plate column or a column containing packing. The upper portion of the column 3 is provided with valved inlet conduits 4, 6 and 7. By this construction, one of the components to be employed in the process fed in through conduit 8 may be injected into the apparatus at various levels or at a plurality of points or both.

The lower section of extraction apparatus 2 as at 9 is also provided with a plurality of valved conduits 11, 12 and 13. By this arrangement, another component supplied through conduit 14 may be fed into the extraction unit at various points and levels.

Conduit 14 may also have connected thereto another conduit 24, the purpose of which will be more apparent hereinafter.

At a still lower section 16 in the extraction unit 2 there is provided a valved draw-off conduit 17. This conduit may be connected with a vent construction 18. At some portion of the line 17, there may be provided a draw-off conduit 19. This conduit may be attached to conduit 17 by means of the valved connections 21, 22 and 23, to movable facilities for withdrawing liquid at various levels.

The upper portion of unit 2 may be provided with a plurality of valved outlet conduits 26, 27 and 28 which are joined through conduit 29 to a still pot or a vaporizer 31. This arrangement permits withdrawal of materials at various levels from the extraction unit and the conductance thereof to the vaporizer. The vaporizer or still pot 31 is also provided with the conduits 32, 33 connected to the bottom and top thereof and also connected at 34, 36 and 37 to the aforementioned conduit 24. By this arrangement certain materials may be returned to the extraction system in a regulated manner.

The upper portion of the device 31 is provided with vapor off-take conduit 38 which leads through one or more condensers 39 to a valved draw-off 41. A dephlegmator, or other means, may be inserted in conduit 38 as at 42.

In accordance with the preferred embodiment of my process, I employ, as a solvent for extracting the aliphatic acid, an alcohol containing 10 carbon atoms. This alcohol may be any one of the products borneol, fenchenol or alpha terpineol. These may be employed either in the chemical pure or commercially obtainable condition.

This product has the following physical characteristics: Boiling range—B. P.–171° C.; 10%–192° C.; 40%–201° C.; 60%–205° C.; 90%–209° C.; dry–212° C.; sp. gr. 15.5°–0.936; NaOH soluble—none; H2O soluble in oil at 20° C.–2%; at 80° C.–2%; oil soluble in water—none; no color reaction with ferric chloride, sulphuric and nitrite.

My various agents may be employed singularly or in admixture as will be illustrated in detail hereinafter. For example, my various agents may include the presence of pinenes and di-pentenes in varying amounts. I have found that such components further improve my agents for use in recovery of acids from stronger solutions. All of my various alcoholic agents may be employed in admixture with more or less esters. For example, using borneol, fenchenol, alpha terpineol or the like in the treatment of acetic acid, various acetates of these agents may be present or formed and I have found that they in no way alter or interfere with the operation of my process. It is to be noted that my preferred agents comprise carbo-cyclic alcohols of the non-benzenoid hydrocarbons with the formula $C_{10}H_{17}OH$ with various amounts of pinenes and di-pentenes; either separately or in their several combinations along with various esters. From further description of my novel agents, it will be readily apparent that they are superior in a number of respects to prior art agents as aromatic compounds such as phenols, creosotes, hydro-cresols, etc. It is further apparent that my novel agents chemically distinguish from such aromatic compounds inasmuch as aromatic compounds are defined as substances derived from benzol in which the benzene ring remains unaltered. On the other hand, it will be observed that my novel agents are not in any way connected with the aromatic agents as they are described as the non-benzenoid hydrocarbons.

Further information concerning my improved agents may be observed from the following table:

*Distribution coefficients of carbo-cyclic alcohols with various strength acetic acid solutions*

| | Gm./100 cc. acetic acid water layer | Gm./100 cc. acetic acid solvent layer | Coefficient Cs/Cw |
|---|---|---|---|
| 1. 70% mixture of borneol, fenchyl alcohol and alpha terpineol—30% pinenes and dipentenes. | 2.16<br>7.50<br>34.50<br>61.50—end | 0.93<br>3.00<br>10.92<br>point—27.00 | 0.431<br>0.400<br>0.317<br>0.438 |
| 2. 82% mixture of borneol, fenchyl alcohol and alpha terpineol—18% pinenes and dipentenes. | 3.90<br>8.16<br>18.00<br>52.40—end | 2.52<br>5.40<br>9.48<br>point—33.00 | 0.646<br>0.661<br>0.526<br>0.630 |
| 3. 91% mixture of borneol, fenchyl alcohol and alpha terpineol—9% pinenes and dipentenes. | 4.02<br>16.98<br>50.00—end | 2.94<br>11.28<br>point—32.00 | 0.732<br>0.664<br>0.640 |
| 4. Alpha terpineol | 3.42<br>10.80 | 2.52<br>7.02 | 0.737<br>0.650 |
| Following is same data on the distribution coefficients of ethyl acetate. | 3.12<br>20.46—end | 2.58<br>point—20.46 | 0.826<br>1.000 |

The end points indicated above are the points above which no separation was obtained between the solvent and water layers, in each case.

From the above table it is apparent that my novel solvents function satisfactorily not only for dilute solutions containing aliphatic acids but also may be employed successfully for direct extraction of concentrated solutions. On the other hand, such prior art agents as ethyl acetate for example if employed for extracting aqueous solutions containing large amounts of aliphatic acid have required that the solutions be further diluted by the addition or recycling of dilute acid thereto or other procedure inasmuch as the direct treatment of such concentrated solutions would result in the formation of a mixture in which no separation between solvent and water layers would be obtained.

On the other hand, my novel solvents may be employed to extract more or less concentrated aliphatic acid solutions directly. This is of considerable advantage inasmuch as it permits the direct extraction of solutions resulting from cellulose ester manufacture which may contain 25% or more acid. Also it will be noted that my solvents may be employed to extract solutions containing only a small amount of aliphatic acid, hence my solvents may be used to extract such liquids as pyroligneous liquor which may contain a few per cent up to 10% of aliphatic acids.

For a more complete understanding of my invention, the following example is set forth for describing one method of carrying out my process. It is to be understood that the various values set forth are set forth for the purpose of illustration and are not to be construed as restricting my invention.

An aqueous acetic acid containing solution to be treated is fed into the extraction unit through conduit 8. This solution would probably contain an amount of acetic acid between about 4% and 65%, for example and might be from a variety of sources. The lower part of the unit would be fed with my novel extracting agent. In the instance under description, the liquid known as "Middol" was fed through conduit 14 into the lower part of the unit. The acid-containing solution is flowed in extraction relationship with the extracting agent. It is readily apparent that should different acids be extracted and different extracting agents be used that some rearrangement or reversal of feeds might be required for taking care of different specific gravities, and other properties.

In accordance with the procedure of the present example the extracting agent containing a substantial amount of acid was withdrawn through conduit 29 to the still pot or base heater 31. In this equipment the aliphatic acid contained in the solvent was vaporized therefrom through conduit 38, condensed at 39 and withdrawn at 41. This stripping operation may be carried out under various conditions of pressure and temperature. It is to be noted that with my agents, since the actual ratio of solvent to acid may be less and since the heat employed is for vaporizing the acid, that considerable saving in steam may be obtained. The solvent from which the acid has been removed may then be returned through conduit 25 to conduit 14 where it is re-employed. Inasmuch as my novel solvents function satisfactorily in the heated condition, it is apparent that the heating of the solvent in 31 does not necessarily involve the entire loss of heat inasmuch as the solvent is subsequently returned through the extraction equipment and conduit 29 to the base heater.

The dehydrated acid withdrawn at 41 is of satisfactory quality and may be conducted away for further treatment or various uses.

While I have described the use of "Middol" in the above example, it is to be understood that I may employ my various other novel agents either singularly or in admixture with pinenes, esters, etc. in a similar manner. Also my novel solvents may be employed in methods of the type shown and described in Othmer application Serial No. 755,361 now Patent No. 2,157,143, issued May 9, 1939. Also, my novel extracting agents may be employed by the methods described in various patents and publication relative to the use of high boiling point solvents however, and prefer the procedure set forth herein. Although I have described the use of one extraction column, my extraction step may be carried out in several units or various mechanical extracting equipment such as, for example, in the apparatus shown in Gordon and Zeigler copending application 751,843 now Patent No. 2,176,899 patented October 24, 1939. My solvents, processes and apparatus may be employed in the dehydration and concentration of aqueous solutions containing aliphatic acids obtained from various sources such as from cellulose ester manufacture and pyroligneous liquor.

It is apparent that my invention is susceptible of some modification hence I do not wish to be restricted except insofar as is necessitated by the prior art and the spirit of the appended claims.

I claim:

1. A process for recovering acid from an aqueous solution containing at least one of the lower fatty acids which comprises extracting the aqueous solution with an agent essentially comprising an alcohol having 10 carbon atoms.

2. A process for recovering acid from an aqueous solution containing at least one of the lower fatty acids which comprises extracting the aqueous solution with an agent essentially comprising a carbocyclic alcohol of the non-benzenoid hydrocarbons.

3. In a process for the concentrating of aqueous solutions containing at least one of the lower fatty acids, the step which comprises extracting the aqueous solution with a solvent containing a substantial amount of borneol.

4. In a process for the concentrating of aqueous solutions containing at least one of the lower fatty acids, the step which comprises extracting the aqueous solution with a solvent containing a substantial amount of fenchenol.

5. In a process for the concentrating of aqueous solutions containing at least one of the lower fatty acids, the step which comprises extracting the aqueous solution with a solvent containing a substantial amount of alpha terpineol.

6. In a process for the recovery of acid from aqueous solutions containing at least 20% of one of the lower fatty acids, the step which comprises extracting the aqueous solution with a solvent containing a 10 carbon atom alcohol and pinenes.

7. In a process for the recovery of acid from aqueous solutions containing at least one of the lower fatty acids, the step which comprises extracting the aqueous solution with a solvent essentially comprising a 10 carbon atom alcohol and ester thereof.

8. In a process for the concentrating of aqueous solutions containing at least one of the lower fatty acids, the step which comprises extracting the aqueous solution with a solvent containing about 50-80% of borneol, fenchyl alcohol, and alpha terpineol and about 10-40% of pinenes and di-pentenes.

9. In a process for the concentrating of aqueous solutions containing at least one of the lower fatty acids, the step which comprises extracting the aqueous solution with a solvent containing about 70% of a mixture of borneol, fenchyl alcohol and alpha terpineol and about 30% of pinenes and di-pentenes.

10. A process of recovering at least a part of the acid content of aqueous solutions containing lower aliphatic acids which comprises extracting said solutions with a 10 carbon atom alcohol liquid that is a solvent for said acid, subjecting the extract from the aforementioned step to treatment for separating acid therefrom and returning the 10 carbon alcohol from which at least a part of the acid has been removed to further extractive contact with further aqueous solutions.

11. As a chemical solvent for use in the recovery of acids from aqueous solutions containing at least one of the lower aliphatic acids, an agent essentially comprising a carbo-cyclic alcohol of the non-benzenoid hydrocarbons mixed with pinenes and di-pentenes.

12. As a chemical solvent for use in the recovery of acids from aqueous solutions containing at least one of the lower aliphatic acids, an agent essentially comprising a carbo-cyclic alcohol of the non-benzenoid hydrocarbons with the formula $C_{10}H_{17}OH$ mixed with pinenes and di-pentenes and organic acid esters of the alcohol.

BERNARD K. BRIGHT.